United States Patent [19]
Sickels

[11] Patent Number: 6,166,350
[45] Date of Patent: Dec. 26, 2000

[54] WIRE FEED APPARATUS AND METHOD WITH NONLINEAR STAGE

[75] Inventor: Darrell L. Sickels, Troy, Ohio

[73] Assignee: Illinois Tool Works Inc., Glenview, Ill.

[21] Appl. No.: 09/374,066

[22] Filed: Aug. 13, 1999

[51] Int. Cl.[7] .................................................. B23K 9/133
[52] U.S. Cl. ........................................ 219/137.71; 318/3
[58] Field of Search ........................... 219/137.71, 137.7; 226/30, 42; 318/268, 3

[56] References Cited

U.S. PATENT DOCUMENTS

| Re. 31,367 | 8/1983 | D'Entremont . |
| 4,408,244 | 10/1983 | Weible . |
| 4,427,874 | 1/1984 | Tabata et al. ........................ 219/137.71 |
| 4,856,078 | 8/1989 | Konopka . |
| 5,006,778 | 4/1991 | Bashark . |
| 5,264,766 | 11/1993 | Tracht et al. . |
| 5,617,001 | 4/1997 | Nacewicz et al. . |
| 5,793,171 | 8/1998 | Hayashi et al. . |
| 5,990,447 | 11/1999 | Nowak et al. . |

OTHER PUBLICATIONS

Hobart® Welding Products Handler 120/150 And Piecemaker 14A Gun Apr. 1999.

Primary Examiner—Clifford C. Shaw
Attorney, Agent, or Firm—George R. Corrigan

[57] ABSTRACT

A method and apparatus for wire feeding in an arc welding system includes a wire feed motor and a controller. The controller has an input circuit and an intermediate control signal. The input circuit includes a user selectable wire feed speed input, and the intermediate control signal is responsive to the user selectable wire feed speed input. The user selectable wire feed speed input includes a nonlinear potentiometer, that may be an arcuate, trimmed, potentiometer and provides either step or varying changes in the nonlinear first response, to produce at least two slopes or a varying slope. The intermediate control signal has a first response relative to the user selectable wire feed speed input. The wire feed speed has a second response relative to the intermediate control signal that is undesiredly nonlinear over a range. The wire feed speed has an overall response relative to the user selectable wire feed speed input. The input circuit includes a nonlinear stage resulting in the first response being nonlinear over the range that corrects the undesired nonlinear second response over the range, to produce a desired overall response over the range that is, preferably, more linear than the first and/or second response, or is substantially linear.

38 Claims, 4 Drawing Sheets

WIRE FEED APPARATUS AND METHOD WITH NONLINEAR STAGE

FIELD OF THE INVENTION

The application relates generally to wire feeders used in arc welding, and, more particularly, to a wire feed speed controller for wire feeders used in welding.

BACKGROUND OF THE INVENTION

Many welding applications such as MIG (metal inert gas) or GMAW (gas metal arc welding) utilize a wire feeder to provide filler metal to the weld. Generally, the wire feeder will provide wire at a nominally constant speed (typically given in inches per minute). Wire feed speed controllers control the speed at which the wire is fed to the arc.

A typical prior art wire feeder includes a motor that pulls wire from a reel and feeds the wire at a wire feed speed to the weld arc. The motor is controlled by a wire feed controller that may be a stand alone controller or may be part of a controller that controls other aspects of the welding process. The wire feed controller controls the speed of the wire feeder and typically includes a potentiometer (or digital up/down input buttons) on a front panel of the controller which the user uses to set wire feed speed.

A user selectable input, such as the angular position of a knob, typically determines the resistance of the potentiometer, which is used to set the speed point in the control circuit. Digital systems typically provide the output of an up/down button or other input device to a microprocessor or digital control device. The controller may include feedback circuitry to control the wire feed speed, or the speed control may be open loop.

Generally, the wire feeding system has a response of the wire feed speed relative to the user selectable input. For example, as the user turns the front panel potentiometer a given angular rotation the wire speed the changes a given amount. The response is dependent upon the type of control and the components used to implement the control.

The response of the wire feed speed relative to the potentiometer setting may be described as having a sensitivity: inches/minute/degree of angular rotation of the potentiometer (or user selectable input), which is the relationship between angular position and wire feed speed. The sensitivity is also the slope of the potentiometer versus wire feed speed curve, for a given potentiometer setting.

Additionally, a response may be described as having a slope over a range, which is the average slope of the potentiometer versus wire feed speed curve over that range. When the curve is linear over the range, the response of the wire feed speed relative to the user selected input is said to be linear. Conversely, when the curve is not linear over the range, the response of the wire feed speed relative to the user selected input is said to be nonlinear.

Given the wide variety of welding applications, processes and power supplies, a wide variety of sensitivities is desirable. Some prior art wire feed controllers created two sensitivities by providing a toggle switch to select between a faster range and a slower range. Thus, the angular sensitivity at slower speeds is greater than when using the potentiometer for the full range. However, this requires an additional control switch. Also, this prevented the use of a direct wire feed speed reading, since a single potentiometer knob was used for multiple wire feed speed ranges.

Another prior art system that had multiple sensitivities is described in U.S. patent application Serial No. 08/911,998, now U.S. Pat. No. 5,990,447, which is owned by assignee of this invention, and which is implemented in the Miller® Millermatice® 300 welding power source, has a controller for the wire feed speed that is inherently linear. A nonlinear circuit input circuit provides a variety of gains depending upon the setting of the potentiometer, to create a nonlinear response of the wire feed speed relative to the potentiometer setting, because it is desirable, for the applications for which that welding power source is often used, to have the sensitivity of the potentiometer be greater at lower speeds than at higher speeds.

Conversely, some welding applications and processes may be better implemented when the sensitivity of the user selectable input is constant over an entire range. The Hobart Handler® 120/150, for example, is often operated at the lower end of its wire feed speed range. A nonlinear response, with less sensitivity at the slower speeds, makes it difficult for the operator to achieve the desired wire feed speed (WFS) settings. Thus, a linear response is desired. However, not all controllers provide a linear relationship between the input in output. Thus, it may be desirable to provide a nonlinear stage which corrects for inherent nonlinearity in a controller and/or motor, and create a desired overall response. The combined effect of the nonlinear stage and the inherent nonlinearity may be a substantially linear controller, or one with a desired nonlinearity.

It is typical in the prior art to control a motor i.e. using a pulse width modulated integrated circuit. While such circuits may be designed to be inexpensive, when they are used to dictate a desired response of the motor relative to the user input they are often expensive and require external circuitry to condition the signal coming from a potentiometer. Given the number of components, such a system has increased risk of failure and may be expensive. Thus, it would be desirable to have the response of the motor to the user input be determined by the input circuit.

Given the variety of needs for linear or nonlinear responses, a controller having a user selectable input which may be tailored to a particular response is desirable. Preferably, such a user selectable input will be relatively inexpensive to implement, and not be complicated and require an excessive number of components.

SUMMARY OF THE PRESENT INVENTION

According to a first aspect of the invention a wire feeder includes a wire feed motor and a controller. The controller is coupled to the motor and has an input circuit and an intermediate control signal. The input circuit includes a user selectable wire feed speed input, and the intermediate control signal is responsive to the user selectable wire feed speed input. The intermediate control signal has a first response relative to the user selectable wire feed speed input. The wire feed speed has a second response relative to the intermediate control signal that is undesiredly nonlinear over a range. The wire feed speed has an overall response relative to the user selectable wire feed speed input. The input circuit includes a nonlinear stage resulting in the first response being nonlinear over the range that corrects the undesired nonlinear second response over the range, to produce a desired overall response over the range.

According to a second aspect of the invention a method of feeding wire to a welding arc includes receiving a user selected wire feed speed input and providing an intermediate control signal having, over a range, a first nonlinear response, relative to the user selected wire feed speed input. The speed of a wire feed motor is adjusted in response to the intermediate control signal, such that the speed of a wire feed motor has, over the range, an undesired second nonlinear response relative to the intermediate control signal. The first nonlinear response over the range corrects the undesired second nonlinear response over the range, to produce, over the range, a desired overall response of the speed of the wire feed motor relative to the user selected wire feed speed input.

According to a third aspect of the invention a wire feed motor and a controller. The controller has a user selectable wire feed speed input that included a nonlinear potentiometer. The speed of the wire feed motor is responsive to the user selectable wire feed speed input.

The overall response, over the range, is more linear than the first and/or second response, according to various alternatives.

The user selectable wire feed speed input includes a nonlinear potentiometer, that may be an arcuate, trimmed, potentiometer in other embodiments. The nonlinear potentiometer provides step or gradually varying changes in the nonlinear first response, to produce at least two slopes or a varying slope in some embodiments.

The overall response of the wire feed speed relative to the user selectable wire feed speed input is substantially linear in one alternative.

Other principal features and advantages of the invention will become apparent to those skilled in the art upon review of the following drawings, the detailed description and the appended claims.

Figure 1:
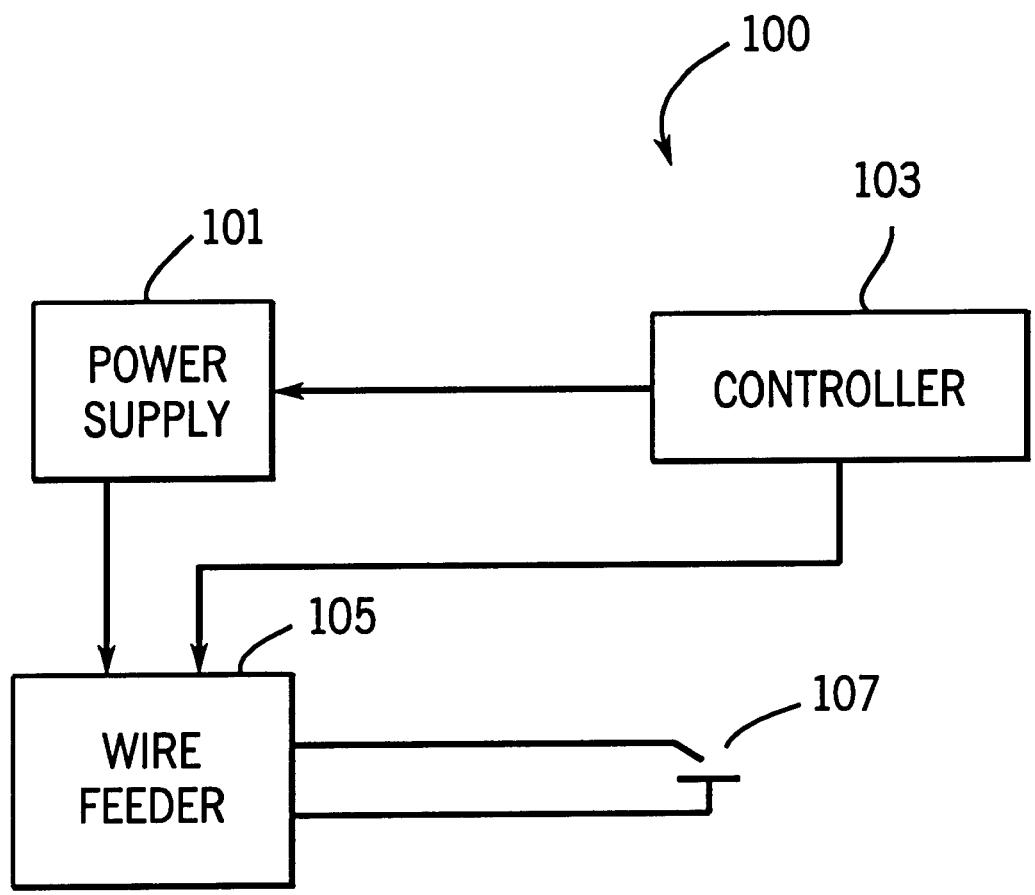
FIG. 1 is a block diagram of a welding power supply constructed in accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular control circuit, power supply and wire feeder it should be understood at the outset that the invention may be implemented using other control circuits, power supplies, and wire feeders.

Generally, the present invention provides for a controlled response of the wire feed speed with respect to changes in a front panel potentiometer setting. The potentiometer (or other input device) is chosen, in the preferred embodiment, to provide the desired overall response, taking into consideration the response of the remaining portion of the control circuit and the motor. More specifically, in the preferred embodiment, the remaining portion of the control circuit is generally nonlinear, and the potentiometer is nonlinear in an opposite manner, so as to provide a substantially overall (i.e. wire feed speed relative to the user selectable input) linear response of wire feed speed with respect to the potentiometer setting. In alternative embodiments the desired response is nonlinear, and the potentiometer is tailored to produce the desired nonlinear response.

Referring now to FIG. 1 a block diagram of a welding system that implements the present invention is shown. A MIG welding system 100 includes a wire feeder 105 which is controlled by a controller 103. A MIG power supply 101 is also controlled by controller 103. In operation power supply 101 provides power to wire feeder 105. Wire feeder 105 feeds wire to an arc 107, at a rate determined by controller 103.

In accordance with the preferred embodiment welding system 100 may be of the type sold commercially, such as a Hobart Handler® 120/150. Power supply 105 receives input power via a 115/230 VAC receptacle.

Power supply 101, controller 103 and wire feeder 105 are shown as discrete blocks in FIG. 1. However, in practice, controller 103 may be part of power supply 101 or wire feeder 105. Additionally, all three blocks may be contained within a single housing, and may be sold as a unit or separately. In other alternatives controller 103 is distributed such that part of it is in power supply 101, and part of it is in wire feeder 105.

Figure 2:
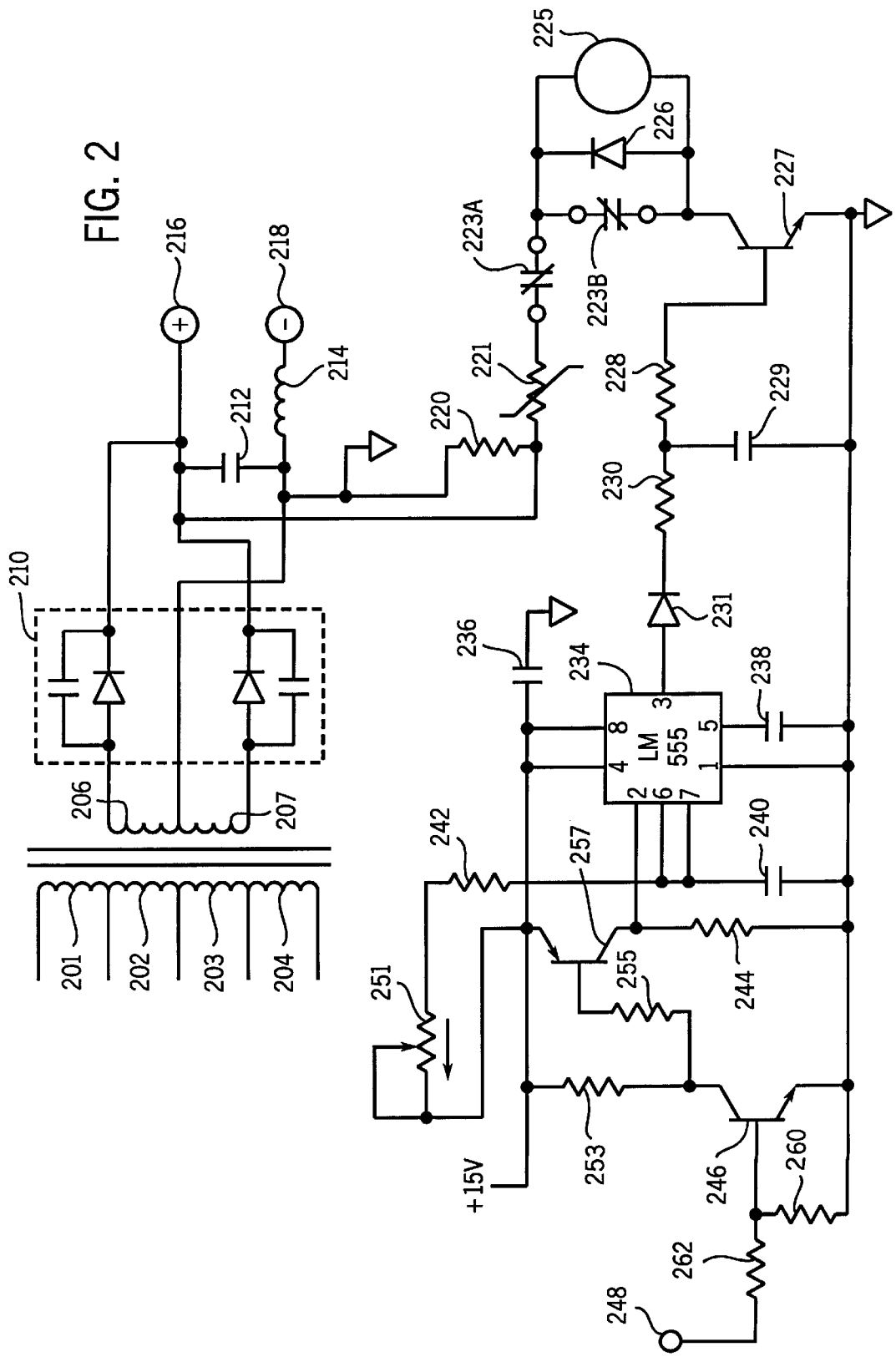
FIG. 2 is a schematic of the power transformer and controller of FIG. 1.

Power supply 101 includes a power transformer such as that shown in FIG. 2. (Other circuitry of power supply 101 is not shown). As seen in FIG. 2 the primary side of the transformer has four taps and multiple windings 201–204, and the secondary has two windings 206–207. A rough control of the output welding voltage is obtained by selecting one of the various taps on the primary side of winding (which is connected to the 115/230 VAC input). Primary windings 201–204 have 113 turns, 11 turns, 12 turns, and 13 turns, respectively. Secondary windings 206 and 207 each have 20 turns. Thus, depending upon the tap selected, the peak secondary voltage will be between 28.78 volts and 21.83 volts.

The secondary of the transformer is connected to a weld output power circuit which includes a center-tapped full-wave rectifier circuit 210. Two half-wave rectifier circuits are combined to use both half-cycles of the secondary output voltage. A large electrolytic capacitor 212 (53,000 $\mu F$) filters the full-wave rectified signal into a smooth DC signal. A resistor 220 (50 ohms) is provided on the pc board to discharge capacitor 21. An output choke or inductor 214 (345 $\mu H$) is provided to smooth current flow to a pair of weld output studs 216 and 218. The core size, and component values may be calculated in a conventional manner.

The circuit and topology of FIG. 2 is used in the preferred embodiment, but any circuit, topology, and power supply may be used as well. Examples of other arrangements with which this invention may be implemented include (but are not limited to) convertors or invertors, phase control, control by switching (not tap selection), AC output, CV output, etc.

The rectified output of rectifier 210 is also provided to a wire feed motor 225 through a thermistor (PTC) 221 and a normally open relay 223A. Thermistor (PTC) 221 provides over-current protection to the motor circuit. The holding current of the thermistor (PTC) 221 is rated at 1.1A. The normal operating current of the motor while it's feeding wire is 0.9A. If the motor is stalled due to a feed problem, it will draw excessive current and cause the PTC to switch to a high impedance state, effectively opening the motor circuit. The PTC will remain in its high-impedance state until power is removed from the circuit and the PTC is allowed to cool.

Normally open relay 223A is closed when the gun (torch) switch is closed, and power is thus provided to the wire feed motor. Normally open relay 223A opens when the gun (torch) switch is released and power is thus removed from the wire feed motor. A normally closed relay 223B is provided to short the wire feed motor and provide a dynamic brake to the motor when the contactor gun (torch) switch is released. Normally closed relay 223B is opened when the gun (torch) switch is closed, and the brake is thus removed. Normally closed relay 223B is closed when the gun (torch) switch is opened, and the brake is thus applied.

Feed motor 225 is connected to ground through a transistor 227 (part of controller 103), which controls the turning on and off of feed motor 225. A flyback diode 226 is provided across the motor winding to provide a path for the energy to dissipate while transistor 227 is not on. An RC network comprised of resistor 228 (3.92 K ohms), resistor 230 (1.00 K ohms) and capacitor 229 (0.001 µF) protects transistor 227 from noise generated by motor 225.

Controller 103 includes a wire feed speed (WFS) control circuit which is generally a pulse width modulated control. Greater pulse widths deliver more power to motor 225, and result in a faster wire feed speed. The pulse width modulation is implemented using a low-cost, industry-standard LM555 timer 234. Motor 225 runs fastest with the output of timer 234 at its maximum pulse width. The output pulse of timer 234 (pin 3) is applied through a diode 231 to the RC network comprised of resistors 230 and 228 and capacitor 229. In the preferred embodiment the current provided to the motor is a speed control input because the speed of the motor is responsive to the average current magnitude. The speed control input may be a digital or analog control signal in embodiments where the motor includes a controller.

Generally, timer 234 is configured in a conventional manner and its pulse width is adjusted by a user selectable input such as a nonlinear potentiometer 251 (0–50 K ohms), or some other speed control input. The potentiometer may be replaced with digital components such as an up/down button and a microprocessor, or a potentiometer and a look-up table in other embodiments). Potentiometer 251 is nonlinear in a manner so as to compensate for other nonlinearities in the timing circuit and/or the motor, as will be described in detail below. Potentiometer 251 is part of an input circuit because it provides an input (a user input in the preferred embodimen) to the controller. The input circuit may include other components, such as filters, amplifiers, a/d convertors, etc.

The pulse width/timing may be understood beginning with node 248. The signal at node 248 is the full-wave rectified line signal (60 Hz in the United States), thus this signal goes to 0V every 8.3 mS. The signal at node 248 is applied to the base of a transistor 246 through resistors 262 (10 K ohms) and 260 (10 K ohms). Each time the signal at node 248 drops below 0.7 V, a transistor 246 is switched off. Transistor 246 is connected to the base of a transistor 257 through a resistor 255 (10 K ohms) (and to a regulated 15 V supply through a resistor 253 (10 K ohms)). Thus, when transistor 246 is turned off, transistor 257 turns off. This removes the voltage across a resistor 244 (10 K ohms), which is connected to the trigger input (pin 2) of timer 234. When the signal at node 248 rises above 0.7 V and switches transistor 246 on, transistor 257 is switched on, which applies 15 V across resistor 244. This creates a trigger pulse for timer 234 at pin 2 which is synchronized to the AC line at 120 Hz.

Each time timer 234 is triggered by a low signal at pin 2, the output (pin 3) goes high for a time determined by an RC combination of potentiometer 251, resistor 242, (10.0 K ohms) and capacitor 240 (0.1 µF). Capacitor 240 will charge from the +15 V supply through potentiometer 251 and resistor 242 ohms) when a trigger occurs, until the voltage at pins 6 and 7 of timer 234 reaches the threshold voltage ($\frac{2}{3}$ $V_{cc}$) or 10 V, and then capacitor 240 discharges (through timer 234). The output of timer 234 (pin 3) will switch to a high state while capacitor 240 is charging and will remain high until capacitor 240 discharges.

Any signal which is created as part of the timing circuit may be considered an intermediate control signal. For example, the voltage across resistor 242, or the voltage at pins 6 & 7 of timer 234 may be considered intermediate control signals.

With potentiometer 251 adjusted to its minimum (shorted-out), the charging time, and thus the pulse width and motor speed, is at a minimum. As the WFS control (potentiometer 251) is rotated to maximum, the charging time of capacitor 240 is increased as resistance is added into the circuit, and the pulse width (and hence the motor speed) increases. With potentiometer 251 adjusted to its maximum, the charging time, and thus the pulse width and motor speed, is at a maximum.

Much of what has been described thus far is a typical welding power supply, wire feeder and controller. Alternative embodiments include using a controller having all analog or predominantly digital circuitry. The timer circuit and motor should be ideally linear, but the components used to implement the timing circuit and motor, and the non-ideal nature of real circuits and the motor introduce nonlinearities into the PWM control. Thus, while the PWM circuit may be inexpensive it and the motor are nonlinear, or form a nonlinear stage(s).

Given the applications and processes for which the preferred MIG welding system is likely to be used, a linear response of wire feed speed relative to potentiometer setting is desired. Thus, in accordance with the preferred embodiment the nonlinear nature of the timing circuit and motor is corrected by a nonlinear pot. Specifically, potentiometer 251 is created to be nonlinear in such a way as to compensate for the nonlinearity of the remainder of the timer circuit and motor, i.e. the response of the wire feed speed to the timer circuit (excluding potentiometer 251 such as to an intermediate control signal at pins 6 & 7 of timer 234.

The desired resistance for various angular positions of potentiometer 251 was determined first by calculation, and then refined empirically, and was selected to provide an overall substantially linear response. However, the desired resistance could be determined in other ways, and could be chosen to provide other than a linear overall response.

Figure 3:
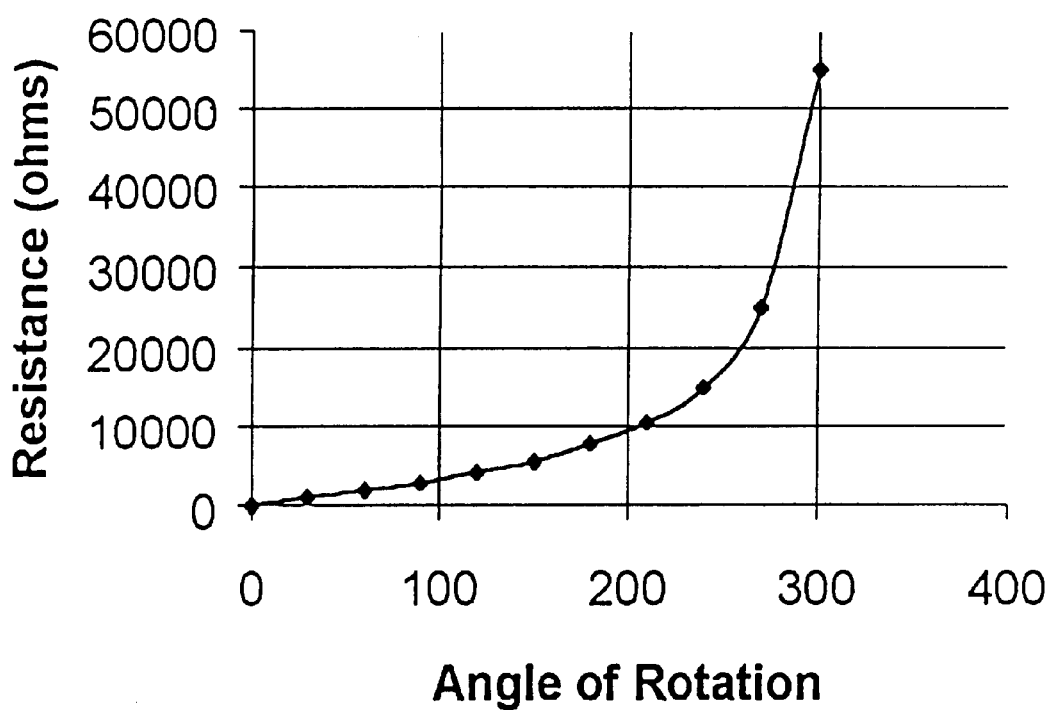
FIG. 3 is a graph of the resistance of a nonlinear potentiometer used to implement the present invention.

Referring now to FIG. 3, a graph showing empirical data for the resistance of potentiometer 251 is shown. Each dot on the graph represents one data point, and the curve connecting the dots shows the resistance between points. A nonlinear potentiometer may be purchased commercially, or may be specially made. The preferred potentiometer is similar to a linear potentiometer in that it has a partial annular (arcuate) shape and the wiper is turned by turning a knob on the front panel. The resistance is proportional to the width of the annulus, and it's nonlinearity is created by a changing width. The preferred potentiometer is created by laser trimming (i.e. cutting to a desired width) to create the desired width annulus. The changing width of the annulus may be smooth to produce a gradually changing (varying) response slope, or it may have a step change in width to create abrupt or step changes in response slope.

Figure 4:
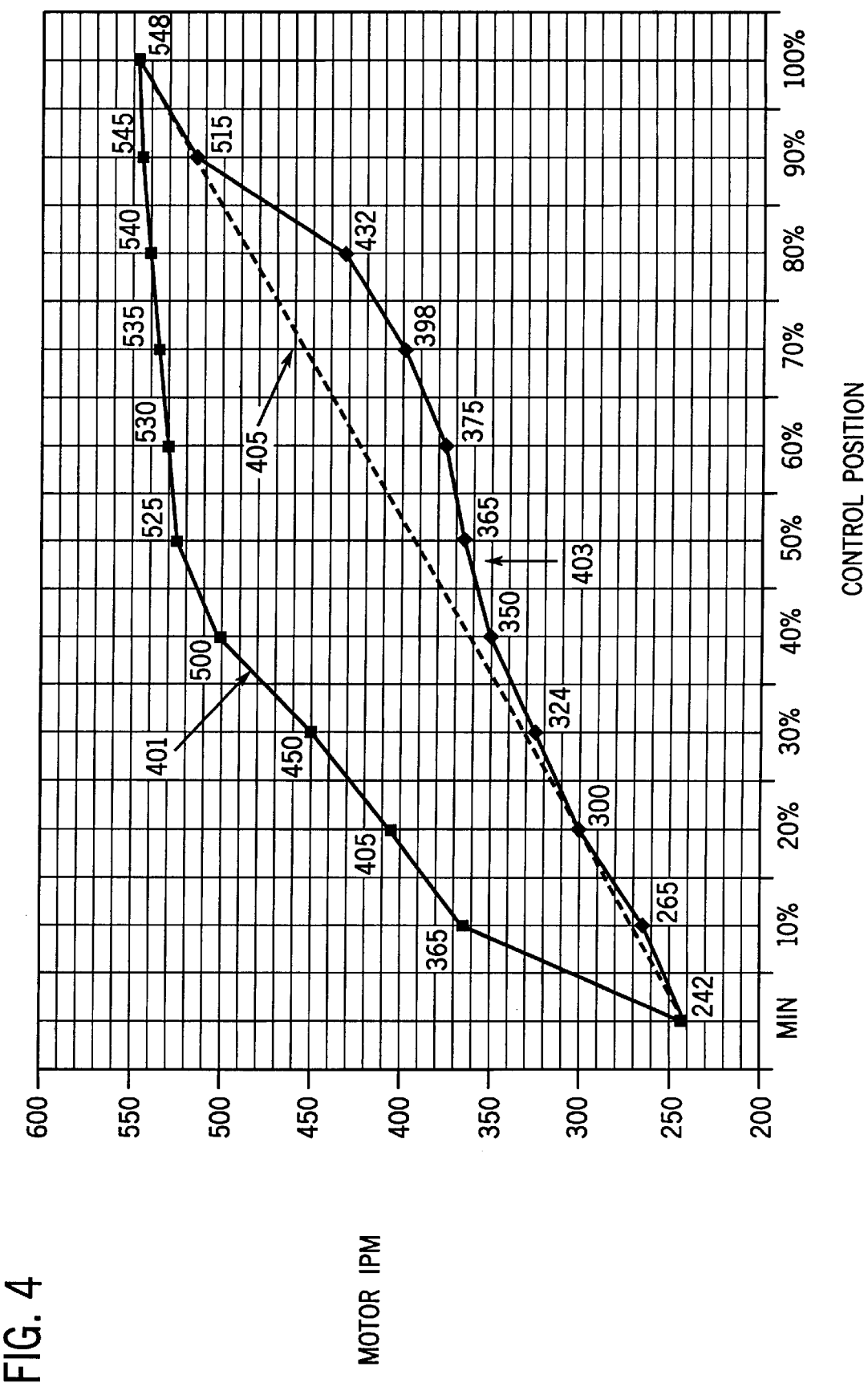
FIG. 4 is a graph for various systems of the response of wire feed speed to the user selectable input.

Referring now to FIG. 4, a graph showing the overall response, i.e, the control position of a potentiometer versus inches per minute (IPM) of motor 225 is shown. A line 401 shows the overall response using a linear potentiometer. Since the potentiometer is linear, the slope of curve 401 will be the slope of the response curve of the remaining portion of the timer circuit amd motor. A line 403 shows the overall response using nonlinear potentiometer 251.

It may be seen that the overall response with nonlinear potentiometer 251 is substantially linear, and that the overall response with nonlinear potentiometer 251 is more linear than the response of the timer circuit, and more linear than the response of just potentiometer 251 (FIG. 3). Also, an exactly linear response is shown (line 405).

Thus, it may be seen that the input circuit of a controller can be made intentionally nonlinear to correct for nonlinearities elsewhere in the controller. This is preferably done with a nonlinear potentiometer that may be easily made and relatively inexpensive. Because the nonlinear potentiometer may correct for nonlinearities in the remainder of the control circuit, the remainder of the control circuit may be inexpensively made, using relatively few components.

Numerous modifications may be made to the present invention which still fall within the intended scope hereof, such as implementing the invention on a system used for other welding processes, providing an overall response that is intentionally nonlinear, precisely linear, providing a controller that is part of the wire feed motor (including an intermediate control signal), using other input circuits such as digital switches, rotary switches with different resistors, linear resistors with varying gain stages, etc.

Thus, it should be apparent that there has been provided in accordance with the present invention a method and apparatus for controlling a wire feeder with a nonlinear stage that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A wire feeder comprising:
   a wire feed motor, wherein the wire feed motor operates at a wire feed speed; and
   a controller coupled to the motor, wherein the controller has an input circuit and an intermediate control signal;
   wherein the input circuit includes a user selectable wire feed speed input such that the intermediate control signal is responsive to the user selectable wire feed speed input;
   wherein the intermediate control signal has a first response relative to the user selectable wire feed speed input, the wire feed speed has a second response relative to the intermediate control signal that is an undesired nonlinear second response over a range, and the wire feed speed has an overall response relative to the user selectable wire feed speed input; and
   wherein the input circuit includes a nonlinear stage resulting in the first response being nonlinear over the range that corrects the undesired nonlinear second response over the range, to produce a desired overall response over the range.

2. The wire feeder of claim 1, wherein, over the range the overall response is more linear than the first response.

3. The wire feeder of claim 1, wherein, over the range the overall response is more linear than the second response.

4. The wire feeder of claim 1, wherein the user selectable wire feed speed input includes a nonlinear potentiometer.

5. The wire feeder of claim 4, wherein the nonlinear potentiometer is an arcuate, trimmed, potentiometer.

6. The wire feeder of claim 4, wherein the nonlinear potentiometer provides step changes in the nonlinear first response, whereby the nonlinear first response has at least two slopes.

7. The wire feeder of claim 4, wherein the nonlinear potentiometer provides varying changes in the first nonlinear response, whereby the first nonlinear response has a varying slope.

8. The wire feeder of claim 1, wherein, over the range, the overall response is more linear than the first nonlinear response and the overall response is more linear than the second nonlinear response, and further wherein the input circuit includes a digital circuit.

9. The wire feeder of claim 1, wherein, over the range, the overall response is more linear than the first response and the overall response is more linear than the second response.

10. The wire feeder of claim 1, wherein the user selected wire feed speed input means for providing nonlinear changes in resistance is a potentiometer.

11. A wire feeder comprising:
    a wire feed motor, wherein the wire feed motor operates at a wire feed speed; and
    a controller means for controlling the wire feed motor, coupled to the motor, wherein the controller has an input circuit means for receiving a user selected wire feed speed input, and further wherein the controller means has means for providing an intermediate control signal, such that the intermediated control signal is responsive to the user selected wire feed speed input;
    wherein the intermediate control signal has a first response relative to the user selectable wire feed speed input, the wire feed speed has a second response relative to the intermediate control signal that is an undesired nonlinear second response over a range, and the wire feed speed has an overall response relative to the user selectable wire feed speed input; and
    wherein the input circuit includes a nonlinear stage resulting in the first response being nonlinear over the range that corrects the undesired nonlinear second response over the range, to produce a desired overall response over the range.

12. A method of feeding wire to a welding arc, comprising:
    receiving a user selected wire feed speed input;
    providing an intermediate control signal having, over a range, a first nonlinear response, relative to the user selected wire feed speed input; and
    adjusting the speed of a wire feed motor in response to the intermediate control signal, such that the speed of a wire feed motor has, over the range, an undesired second nonlinear response relative to the intermediate control signal;
    wherein the first nonlinear response over the range corrects the undesired second nonlinear response over the range, to produce, over the range, a desired overall response of the speed of the wire feed motor relative to the user selected wire feed speed input.

13. The method of claim 12, wherein, over the range the overall response is more linear than the first response.

14. The method of claim 13, wherein, over the range the overall response is more linear than the second response.

15. The method claim 12, wherein receiving a user selected wire feed speed input includes receiving a signal from a nonlinear potentiometer.

16. An apparatus for arc welding comprising:
a welding power supply disposed to provide power to the arc;
a wire feed motor, disposed to provide wire to the arc, wherein the wire feed motor operates at a wire feed speed; and
a controller coupled to the motor, wherein the controller has an input circuit and an intermediate control signal;
wherein the input circuit includes a user selectable wire feed speed input such that the intermediate control signal is responsive to the user selectable wire feed speed input;
wherein the intermediate control signal has a first response relative to the user selectable wire feed speed input, the wire feed speed has a second response relative to the intermediate control signal that is an undesired nonlinear second response over a range, and the wire feed speed has an overall response relative to the user selectable wire feed speed input; and
wherein the input circuit includes a nonlinear stage resulting in the first response being nonlinear over the range that corrects the undesired nonlinear second response over the range, to produce a desired overall response over the range.

17. The wire feeder of claim 16, wherein, over the range the overall response is more linear than the first response.

18. The wire feeder of claim 17, wherein, over the range the overall response is more linear than the second response.

19. The wire feeder of claim 17, wherein the user selectable wire feed speed input includes a nonlinear potentiometer.

20. The wire feeder of claim 19, wherein the nonlinear potentiometer provides step changes in the first nonlinear response, whereby the first nonlinear response has at least two slopes.

21. The wire feeder of claim 20, wherein the nonlinear potentiometer provides varying changes in the first nonlinear response, whereby the first nonlinear response has a varying slope.

22. The wire feeder of claim 16 wherein, over the range, the overall response is more linear than the first nonlinear response and the overall response is more linear than the second nonlinear response, and further wherein the input circuit includes a digital circuit.

23. An apparatus for arc welding comprising:
a welding power supply disposed to provide power to the arc;
a wire feed motor disposed to provide power to the arc, wherein the wire feed motor operates at a wire feed speed; and
a controller means for controlling the wire feed motor, coupled to the motor, wherein the controller has an input circuit means for receiving a user selected wire feed speed input, and further wherein the controller means has means for providing an intermediate control signal, such that the intermediate control signal is responsive to the user selected wire feed speed input;
wherein the intermediate control signal has a first response relative to the user selectable wire feed speed input, the wire feed speed has a second response relative to the intermediate control signal that is an undesired nonlinear second response over a range, and the wire feed speed has an overall response relative to the user selectable wire feed speed input; and
wherein the input circuit includes a nonlinear stage resulting in the first response being nonlinear over the range that corrects the undesired nonlinear second response over the range, to produce a desired overall response over the range.

24. The wire feeder of claim 23, wherein, over the range, the overall response is more linear than the first response and the overall response is more linear than the second response.

25. A method of arc welding, comprising:
providing power to an arc;
receiving a user selected wire feed speed input;
providing an intermediate control signal having, over a range, a first nonlinear response, relative to the user selected wire feed speed input; and
feeding wire to the arc at a speed responsive to the intermediate control signal, such that the speed of feeding has, over the range, an undesired second nonlinear response relative to the intermediate control signal;
wherein the first nonlinear response over the range corrects the undesired second nonlinear response over the range, to produce, over the range, a desired overall response of the speed of feeding relative to the user selected wire feed speed input.

26. The method of claim 25, wherein, over the range the overall response is more linear than the first response.

27. The method of claim 25, wherein, over the range the overall response is more linear than the second response.

28. The method claim 25, wherein receiving a user selected wire feed speed input includes receiving a signal from a nonlinear potentiometer.

29. A wire feeder comprising:
a wire feed motor, wherein the wire feed motor operates at a wire feed speed; and
a controller having a control output coupled to the motor, wherein the controller has a user selectable wire feed speed input including a nonlinear potentiometer, and wherein the wire feed speed is responsive to the user selectable wire feed speed input.

30. The wire feeder of claim 29, wherein, over a range an overall response of the wire feed speed relative to the user selectable wire feed speed input is substantially linear.

31. The wire feeder of claim 30, wherein the nonlinear potentiometer is an arcuate, trimmed, potentiometer.

32. The wire feeder of claim 30, wherein the nonlinear potentiometer provides step changes in the sensitivity of the over all response.

33. The wire feeder of claim 30, wherein the nonlinear potentiometer provides varying changes in the sensitivity of the overall response.

34. An apparatus for arc welding comprising:
a welding power supply disposed to provide power to the arc;
a wire feed motor, disposed to provide wire to the arc, wherein the wire feed motor operates at a wire feed speed; and
a controller having a control output coupled to the motor, wherein the controller has a user selectable wire feed speed input including a nonlinear potentiometer, and wherein the control output is responsive to the user selectable wire feed speed input.

35. The wire feeder of claim 34, wherein, over a range an overall response of the wire feed speed relative to the user selectable wire feed speed input is substantially linear.

36. The wire feeder of claim 34, wherein the nonlinear potentiometer is an arcuate, trimmed, potentiometer.

37. The wire feeder of claim 34, wherein the nonlinear potentiometer provides step changes in the sensitivity of the overall response.

38. The wire feeder of claim 34, wherein the nonlinear potentiometer provides varying changes in the sensitivity of the overall response.

* * * * *